United States Patent [19]
Stallabrass et al.

[11] 3,940,622
[45] Feb. 24, 1976

[54] ICING DETECTOR

[75] Inventors: James R. Stallabrass; T. Rayman Ringer; Donald L. Bailey, all of Ottawa; Patrick F. Hearty, Hull, all of Canada

[73] Assignee: Canadian Patents & Development Limited, Ottawa, Canada

[22] Filed: Feb. 24, 1975

[21] Appl. No.: 552,535

Related U.S. Application Data

[63] Continuation-in-part of Ser. No. 397,689, Sept. 17, 1973, abandoned.

[30] Foreign Application Priority Data
Oct. 23, 1972  Canada.................................. 154432

[52] U.S. Cl. ............................................... 250/338
[51] Int. Cl.² ......................................... G01J 1/00
[58] Field of Search ........... 250/338, 339, 340, 341, 250/358, 361, 362, 363, 369; 73/17 R, 29; 244/134 R

[56] References Cited
UNITED STATES PATENTS
3,276,254  10/1966  Richard.............................. 73/17 R

*Primary Examiner*—Davis L. Willis
*Attorney, Agent, or Firm*—Ronald G. Bitner

[57] ABSTRACT

An icing detector for moving or stationary installations which comprises a probe subject to atmospheric icing, and ice formation sensing means disposed in a duct through which flow of ambient air is induced by ejector defining elements. The induced air flow provides high sensitivity regardless of the relative ambient velocity. An ice/de-ice cycle is repeated providing continuing icing detection. Specific embodiments of the invention provide a measure of icing severity or ambient liquid water content.

20 Claims, 12 Drawing Figures

ICING DETECTOR

CROSS-REFERENCE TO RELATED APPLICATION

This application is a continuation-in-part of application Ser. No. 397,689, filed Sept. 17, 1973 and now abandoned.

BACKGROUND OF THE INVENTION

This invention relates to an icing detector for moving and stationary installations, and more particularly to a detector suited for VTOL aircraft.

Ice forms on the forward facing surfaces of an aircraft or other body when it flies through or otherwise moves relative to clouds of supercooled water droplets. The droplets freeze almost instantaneously upon impact with the aircraft or body, resulting in the formation of ice. For a given velocity and a particular body geometry, the rate of formation is dependent on the liquid water content of the cloud, water droplet diameter and ambient temperature. Conversely, for a given icing condition and body geometry the rate of ice accumulation is a function of relative velocity.

Although ice detectors are known, there exists a need for ice detectors which operate under widely varying ambient air velocities or where the air velocity is insufficient to provide adequate sensitivity. Examples of applications for such detectors include tall structures such as buildings and towers, vessels, stationary gas turbine installations, and VTOL aircraft.

In helicopters, an icing detector is essential if it is to undertake all-weather flying operations owing to the wide range of airspeed at which a helicopter can operate. The most susceptible part of the helicopter to icing is the rotor blade system; this is because the droplet catch efficiency of the rotor blades is high, owing to their comparatively small scale and high velocity, while the catch efficiency on the non-rotating parts of the helicopter is extremely low particularly at low flight velocities for converse reasons. Thus an icing detector is necessary to give the pilot early warning of an icing encounter so that he may take the necessary precautionary action. In addition, if the helicopter is equipped with a rotor blade icing protection system, an ice detector is a necessary component of that system because of the need for immediate activation of the system on entering an icing condition, and for a close control of the allowable ice accretion thickness where the system works on a de-icing principle. To achieve these aims, it is necessary that the ice detector has a high sensitivity, (i.e., capable of detecting small quantities of ice), and a rapid response. The icing rate indication that it provides should relate closely to the rate of rotor blade icing which is affected only in a minor way by flight speed because of the high rotational velocity of the rotor blades.

Most existing types of ice detectors, both for airborne and for static use, rely on the natural relative velocity between the droplet-laden air and the detector sensing surface to deposit supercooled water droplets on that surface. The presence of the water, either in its liquid or its solid phase, on the sensing surface is detected by various means. Because the rate of impingement of the droplets on the surface is a function of the relative velocity, it follows that the response of the device is also a function of the velocity and decreases with decreasing velocity. In addition certain types of detectors require a minimum relative velocity to achieve ice sensing operation.

On helicopters, present means of ice detection employ a standard aircraft ice detector mounted either on the fuselage or in the engine, or other, air inlet duct. These arrangements have not provided satisfactory ice detection or icing rate data suitable for the control of rotor blade icing protection systems because there is no unique correlation between the icing rate as sensed by the ice detector and that experienced by the rotor blades. Additionally, mounting an ice detector in the engine inlet is not desirable because of the danger of engine damage caused by ice shed from the detector. It has been proposed that an ice detector be mounted on the rotor blade itself, thus placing it where the icing measurement is desired; however, this proposal does not find favour because of the complications of sliprings or other devices required to transmit power and detector signals between rotating and non-rotating parts, and of the greater difficulties in incorporating the detector in the rotor blade structure. Most existing ice detectors are designed to detect the presence or absence of an icing condition, but do not provide a quantitative measure of the severity of the condition.

SUMMARY OF THE INVENTION

An object of the present invention is to provide an icing detector that is capable of indicating a potential icing condition regardless of the relative ambient air velocity.

Another object is to provide an indication of the supercooled water droplet content of the ambient air.

A specific object of the invention is to provide means for inducing air flow, relative to an ice sensing element, at a velocity corresponding with, for example, the maximum speed of an aircraft, or the maximum expected wind velocity in a stationary application.

Another object is to provide a quantitative indication of the icing condition.

In accordance with the invention an ice sensing device is placed within a duct through which flow of ambient air is induced. The higher velocity air flow induced through the duct is essentially constant regardless of the value of the ambient air velocity, thus providing a higher water droplet flux through the duct. The ice sensing device comprises a probe, on which ice forms as a result of the impingement of supercooled water droplets, and ice detecting means comprising a radiation emitter and sensor.

Removal of the resulting ice by heating the probe when a predetermined quantity of ice has formed provides an ice/de-ice cycle which can be used to provide either discrete icing signals or a quantitative measure of the rate of icing. Because the duct velocity is nearly constant, the rate of icing on the probe is a direct function of the supercooled liquid water content, which may also be displayed. In addition, the increased velocity through the duct has a cooling effect due to the temperature drop to maintain constant enthalpy. As a result, the sensing device has a higher susceptibility to icing, than the aircraft or other structure with which it is associated.

Induced flow through the duct may be conveniently achieved by means of an ejector. If heated gas is used as the primary fluid in the ejector it can be used to provide anti-icing of the detector structure. The primary jet using heated gas must be arranged to avoid heating of the icing probe, or the ambient air which contacts the probe.

BRIEF DESCRIPTION OF THE DRAWINGS

An embodiment of the invention will be described with reference to the drawings in which.

DESCRIPTION OF THE PREFERRED EMBODIMENTS

Figure 1:
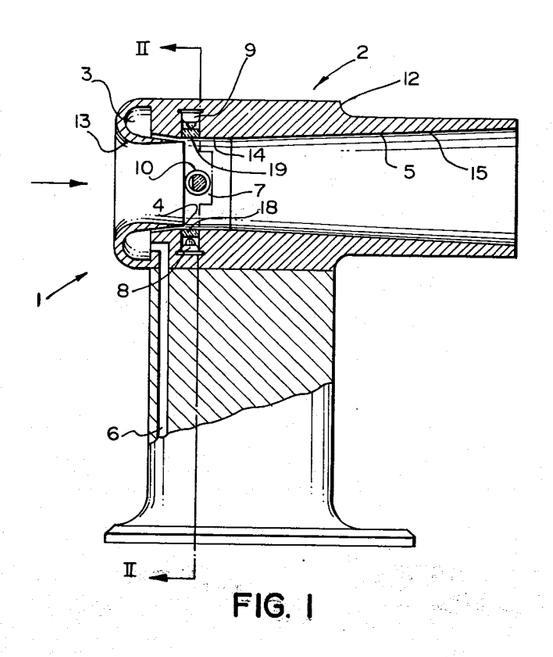
FIG. 1 is a partly sectional view of the detector.

Referring to FIG. 1 the detector 1 comprises a duct member 2 having a plenum 3 formed in one end thereof. The plenum opens rearwardly into the duct defining an annular primary jet outlet 4 for directing a gas rearwardly along the interior surface 5 of the duct member 2. The primary gas induces increased ambient air flow through the duct member 2. Preferably, the primary gas is heated to keep the duct member free of ice. The gas is supplied to the plenum 3 by means of a passageway 6 connected to a suitable source such as the engine compressor.

An icing probe 7, on which ice forms, is mounted transversely within the duct. When operating in conditions conducive to icing, the supercooled water droplets suspended in the ambient air are accelerated with the induced flow of air and those that impinge on probe 7 have their metastable supercooled state upset by contact with the probe and form ice thereon. Because the droplet impingement rate which determines the rate of ice formation depends on velocity, the high induced air flow results in the detector having higher sensitivity to icing than if it were exposed to only the ambient air velocity. Probe heating means for periodically melting accreted ice is provided by suitable electrical means.

To prevent heated air from the primary jet impinging upon and heating the probe 7, insulating bushings 10, whose primary function is to insulate (both electrically and thermally) the probe 7 from the duct wall, project from the inner surface of the duct a distance substantially equal to the thickness of the primary jet.

The duct member 2 comprises three sections, an aerodynamically smooth entry section 13, a short mixing section 14 and a diffuser section 15. Little or no mixing length is employed ahead of the diffuser section to provide inefficient flow augmentation. It is this inefficiency that results in an almost constant velocity of the secondary air over a wide range of ambient air velocities.

Mounted within the duct member 2 are a radiation emitter 8 and sensor 9 which co-operate with the probe 7 to detect the presence of ice by the occlusion of radiation from the emitter 8 to the sensor 9. In order to detect the presence of ice on the probe, the emitter and sensor are disposed such that a central axis of a beam of radiation from the emitter to the sensor is substantially a half beam upstream from the probe. The beam is disposed at a substantial angle with respect to the probe, preferably a right angle.

In the embodiment of FIG. 1 windows 18 and 19 are placed over the emitter 8 and sensor 9 to maintain a smooth duct surface. If necessary the window 19 over the sensor may comprise a filter to limit the spectral content of radiation reaching the sensor.

By locating the emitter and sensor immediately behind the jet 4, the high velocity primary gas flow helps to maintain the windows 18 and 19 clear of contamination.

Figure 3:
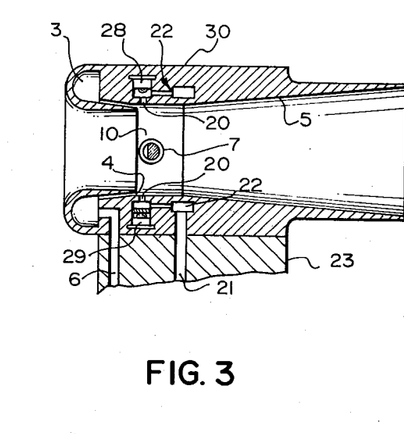
FIGS. 3 to 5 show alternate embodiments of the detector in section.

Cleanliness of the emitter and sensor system may be further enhanced by providing a flow of clean air over these components from a separate source. This may be achieved, as illustrated in FIG. 3, by recessing the emitter 28 and sensor 29 in the duct wall 30, and drawing cabin air, for example, filtered if necessary, through the recesses 20 over the emitter and sensor elements. The clean air is drawn through a passageway 21 in the strut 23, through passageways 22 in the detector body into the recesses 20 by means of the low static pressure created at the recesses 20 by the high velocity air flow across them.

Since the plenum 3 is supplied with heated air, it serves to keep this portion of the duct free of ice.

FIG. 1 shows the duct member having a discontinuity on the outer surface of the duct member at 12. This prevents water running back over the duct outer surface from the heated forward section to the duct exit, which under certain conditions, would cause ice to build up around the exit edge into the interior of the duct. With the discontinuity 12 most of the water that runs back along the outer surface is blown off at the discontinuity.

Figure 2:
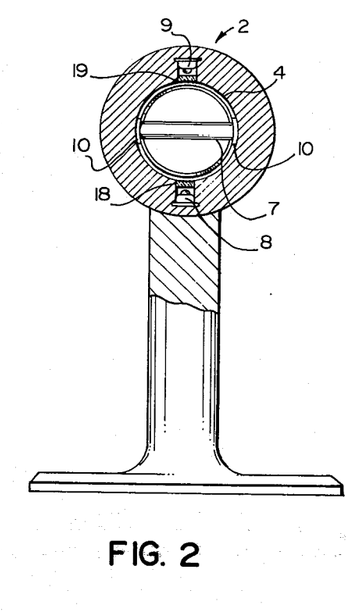
FIG. 2 is a section taken at II—II of FIG. 1.

In FIGS. 1 and 2 the prove comprises a tube having a flat portion near the center on the upstream side. This flat portion ensures that any ice formed is detected, whereas with a cylindrical probe under certain atmospheric conditions ice may form on the flanks of the cylinder while the upstream stagnation point remains free of ice. This occurs at a range of air temperatures just below the equilibrium freezing temperature of water due to the varying heat balance around a cylinder. Under these conditions, the ice formation may not grow forward sufficiently for detection. By providing a flat on the upstream side of the probe, the high droplet catch efficiency and the high convective heat loss at the edge of the flat area result in the formation of ice there and the detection of icing at temperatures closer to 0°C than is possible with a circular probe.

In a case where high temperature icing is of little or no consequence, the beam of radiation could be oriented axially along the upstream edge of a cylindrical probe, thus only detecting ice which actually forms on the upstream edge stagnation region.

The probe is adapted to be de-iced by passing electrical current through it. Because heat is switched off when ice lying in the path of the beam of radiation is removed, there is a danger that, should ice in this area shed slightly before ice on other parts of the probe, the remaining ice could, over several ice/de-ice cycles, grow and cause considerable blockage of the duct, and result in erratic operation. To avoid this, the central region of the probe, in the region of the flat, is designed to head slightly more slowly than the rest of the probe so that ice in the sensing region sheds last. This may, for example, be achieved by reducing slightly the electric resistance at the probe center by applying a thin ring of metal plating.

Figure 4:
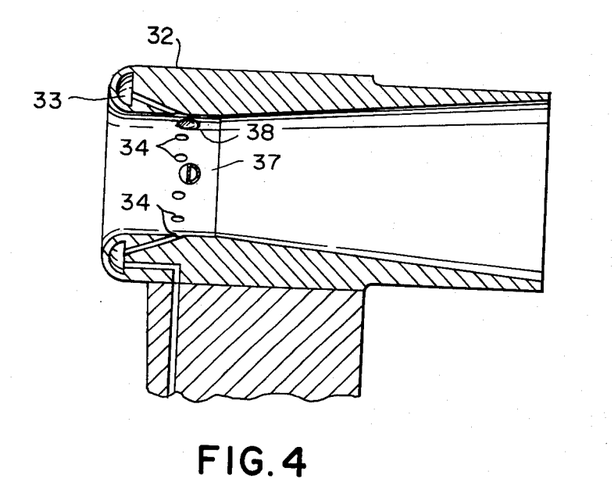
Figure 5:
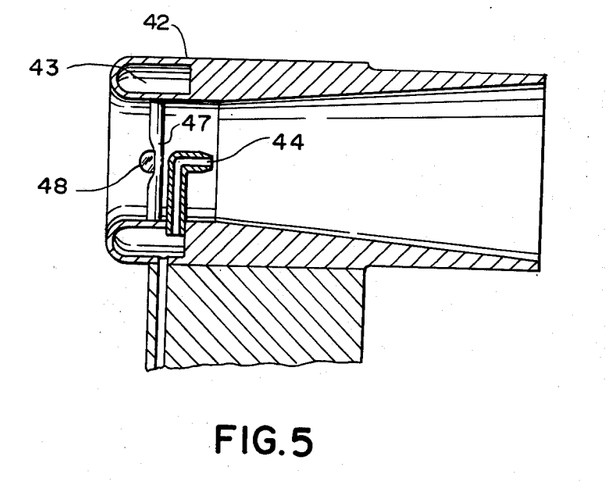

FIGS. 4 and 5 show alternate primary jet outlet configurations. FIG. 4 shows discrete primary jets outlet means 34 communicating with the plenum by means of passageways in the duct member 32. As in the embodiment of FIGS. 1 and 2, the detector includes an icing probe 37 and ice formation sensing means 38. FIG. 5 shows the primary jet outlet means 44 in the form of a single jet disposed coaxially within the duct member 42, with the primary gas taken from the plenum 43.

The embodiments of FIGS. 1 and 3 employing the annular primary jet outlet is more efficient than the central or discrete wall jet of FIGS. 4 and 5, respectively, since the high energy primary flow is everywhere in contact with the wall thus not requiring any mixing length before diffusion, and also permitting the use of a wider angle and hence shorter diffuser. The greater efficiency, as indicated above, is a disadvantage; however, against this must be balanced the possibility of a shorter diffuser resulting in a smaller and lighter unit. Furthermore, water running back into the duct from the heated leading edge is broken up by the high energy primary jet without coming in contact with the duct wall, thus eliminating ice formation within the duct and so eliminating the possible requirement for additional duct member heating.

The emitter and sensor must necessarily employ radiation that is attenuated by ice but does not melt the ice. It was found that a suitable emitter and detector comprises an infra-red emitting diode and a photo-transistor. When using a photo-transistor with wide spectral response a filter transparent to infra-red but opaque to visible light may be placed in front of the sensor. Alternatively, or in addition, the emitted radiation may be modulated to permit rejection of ambient radiation.

Because the rate of occlusion of the infra-red beam area between 25 percent and 75 percent occlusion is very nearly a linear function of the rate of ice build-up on the probe, the occlusion rate within these limits can be used to provide a good measure of the probe rate of icing. A voltage proportional to occlusion rate may be obtained by electronically differentiating the output voltage of the infra-red sensor and applying the differentiated signal to a meter or other read-out or recording device during the quasi-linear mid portion of the occlusion range; at other times the read-out is inhibited or held as its last value.

The rate of occlusion may be used to determine the liquid water content when the air velocity over the probe is maintained constant. By inducing high velocity flow, relative to ambient velocity, through the duct, the velocity will be maintained substantially constant and therefore a good measure of the supercooled liquid water content is obtained from the rate of occlusion.

Figure 6:
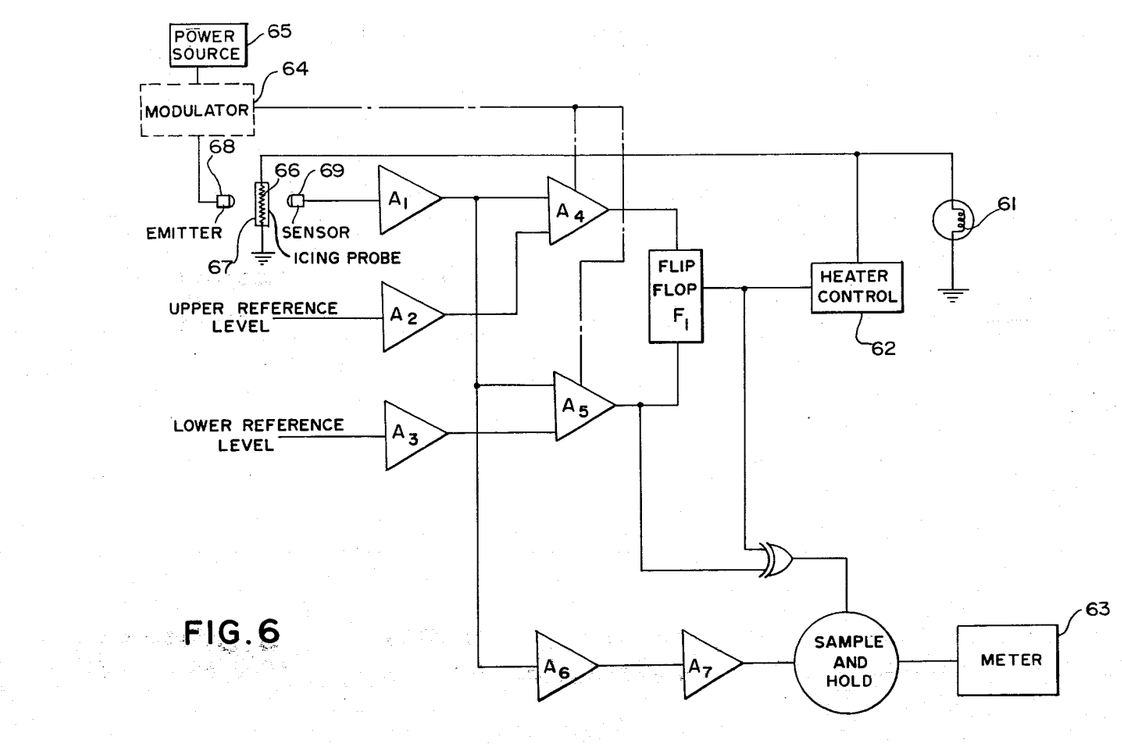
FIGS. 6, 8, 9 and 10 are schematic diagrams showing embodiments of the electrical circuit.
Figure 7:
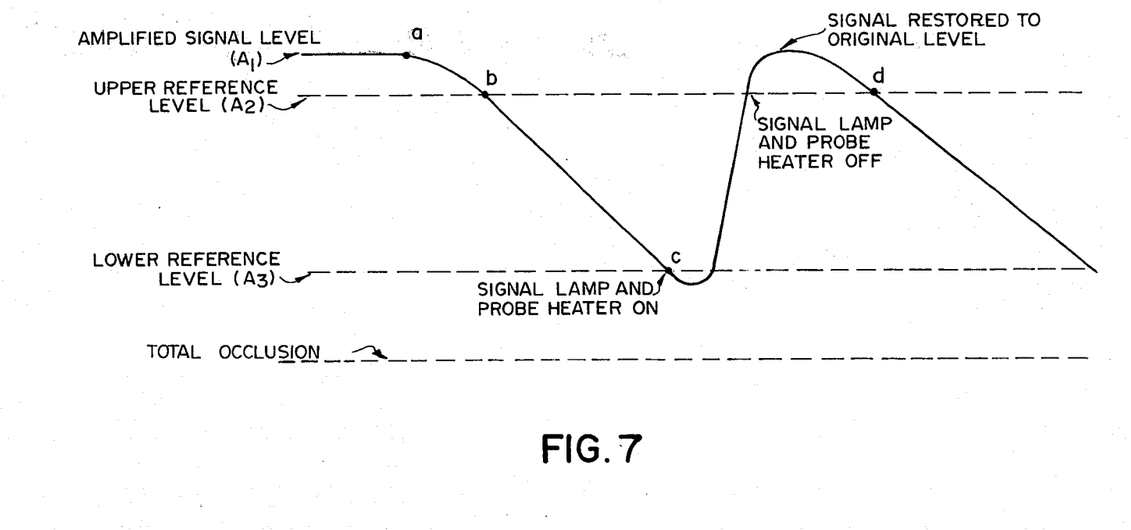
FIG. 7 is a schematic diagram illustrating the icing cycle for the circuits shown in FIGS. 6, 8, 9 and 10.

With reference to FIG. 6, the emitter is driven by a suitable power source 65. If desired, a modulator 64 may be added to produce pulsed radiation. The ice detector probe 67 is positioned relative to the emitter 68 and sensor 69 so that any ice build-up on the probe 67 progressively occludes the emitted radiation with a resultant decrease in signal level. This signal is sensed and amplified by amplifier $A_1$ and compared with two buffered reference signals from $A_2$ and $A_3$ by voltage comparators $A_4$ and $A_5$, configured to form a window detector. The output level of the comparators is dependent on the magnitude of the input signal relative to the aperture of the window detector and will determine the state of flip-flop, $F_1$. The flip-flop in turn controls the power to the detector probe heater 66 and signal light 61, via the heater control 62. FIG. 7 illustrates the ice detecting cycle.

While signal light 61 provides simple ice detection, a measure of probe icing rate or liquid water content may be obtained in the following manner. Referring to FIGS. 7 and 6, point $a$ represents the beginning of ice build-up and beam occlusion. Between point $b$ and $c$ the output of $A_1$ is buffered by $A_6$ and differentiated by $A_7$ which yields an output proportional to the rate of ice formation on the probe which is read by a suitable meter 63. A Sample and Hold element isolates the meter 63 during reset between points $c$ and $d$. The meter therefore displays the differentiator $A_7$ output during the period of probe icing within the window aperture, between points $b$ and $c$, and holds the last measured value during the reset portion of the cycle.

The meter 63 may provide a calibrated output in any convenient form, such as a rate of probe icing, icing severity, or an accurate measure of liquid water content over limited or specified operating speeds.

Figure 8:
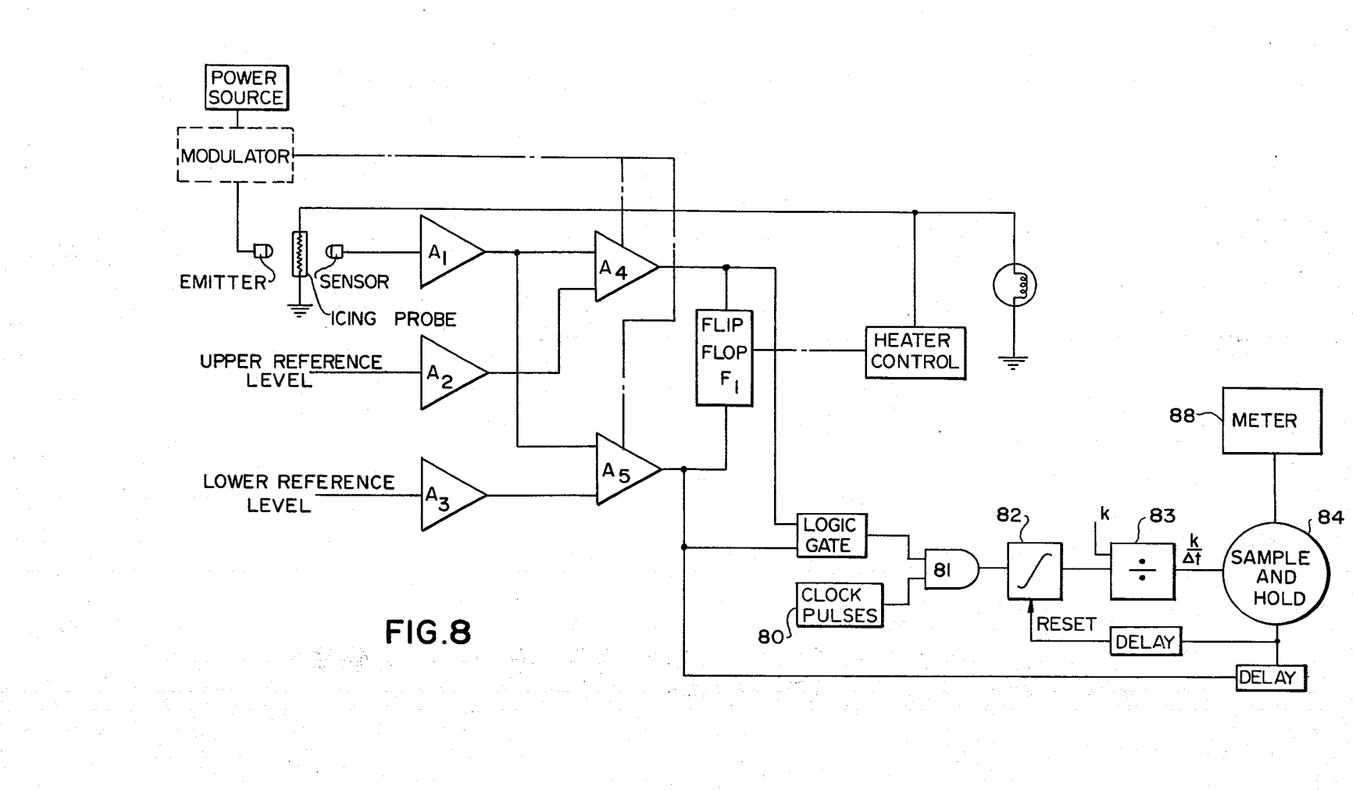
Figure 9:
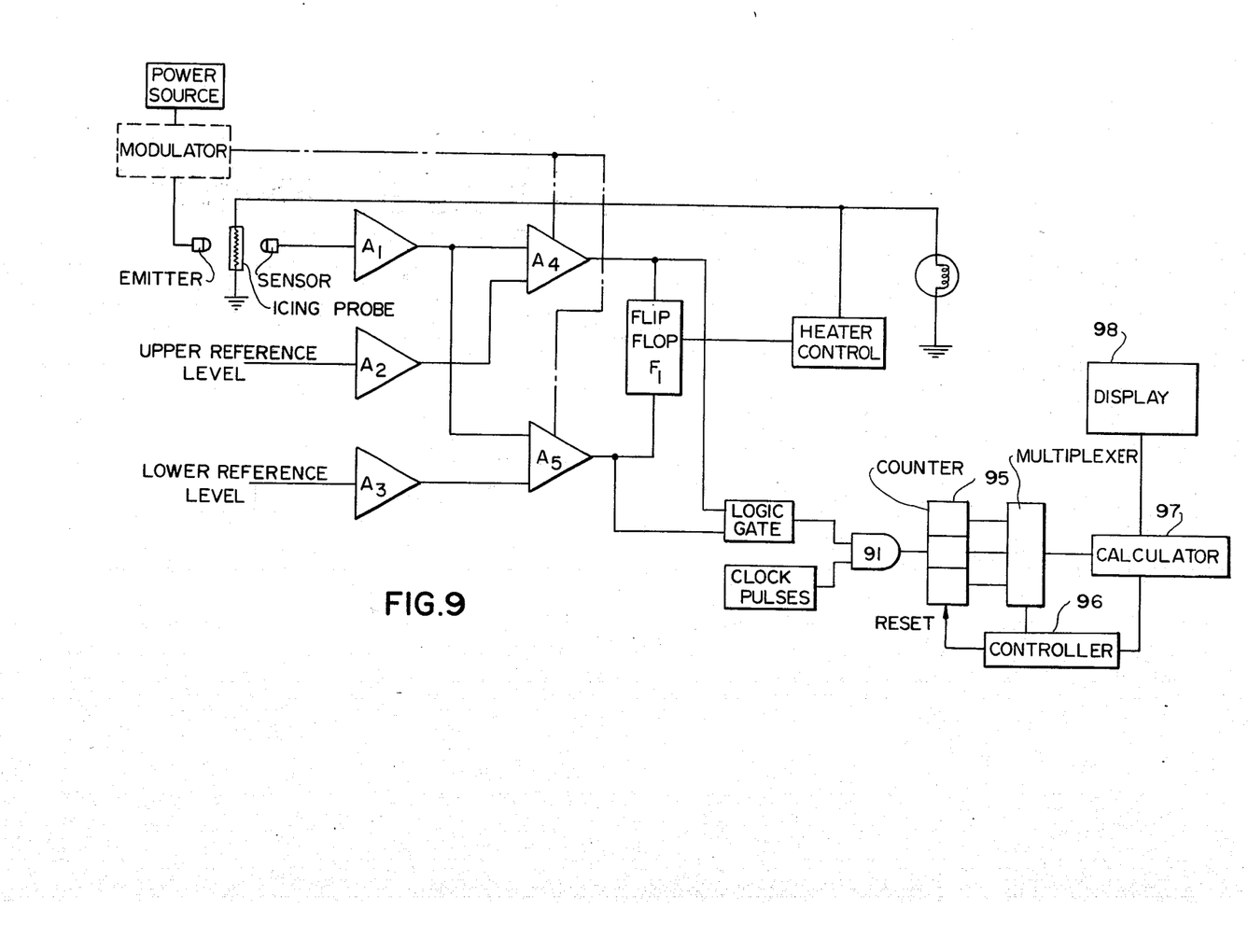
Figure 10:
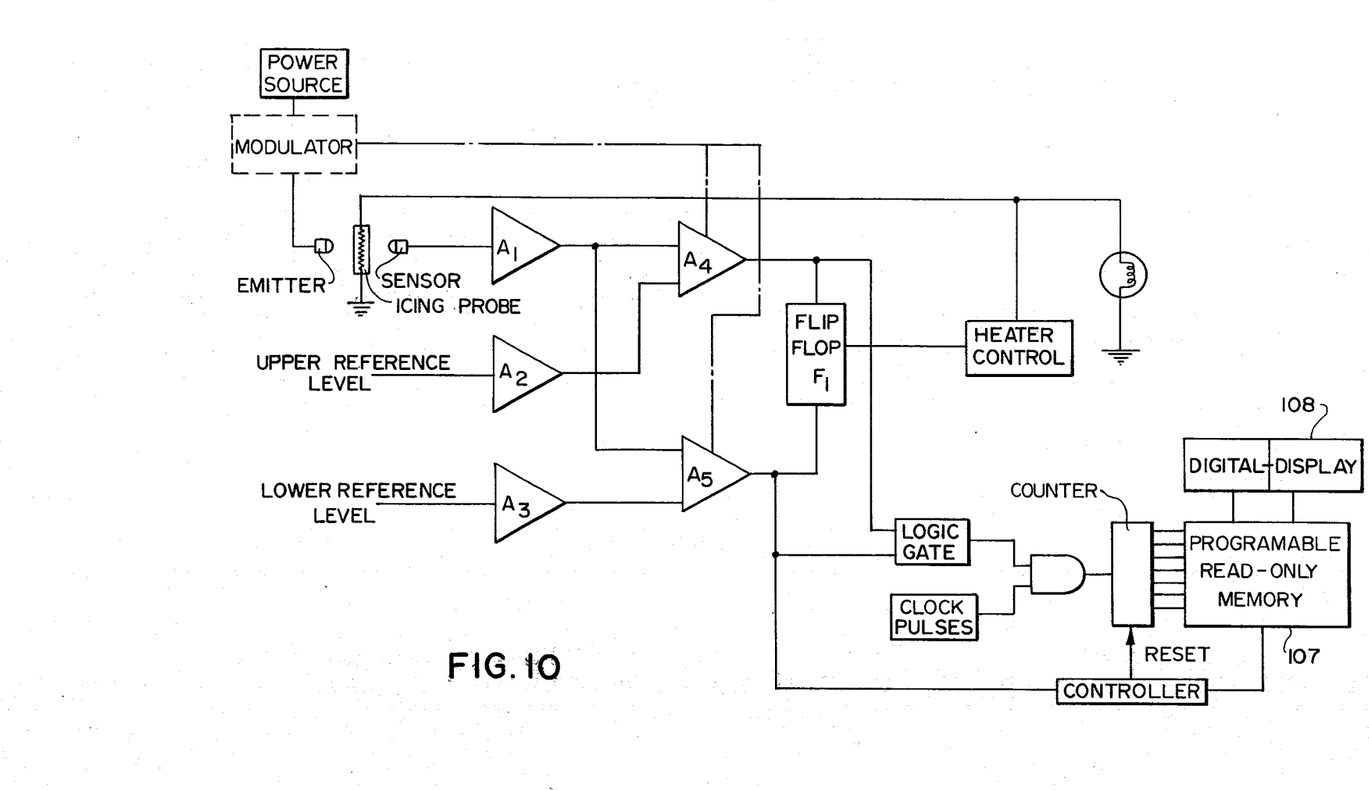

FIGS. 8 to 10 illustrate three alternative means of providing a measure of probe icing rate or liquid water content based on the average slope of the output of amplifier $A_1$ between points $b$ and $c$ as shown in FIG. 7, and which are particularly adapted for high icing rates.

In the embodiment of FIG. 8, a series of clock pulses from generator 80 is gated by AND-gate 81 for the period between points $b$ and $c$ of FIG. 7. These gated pulses are integrated at 82, to provide a voltage proportional to the time interval, $\Delta t$, between points $b$ and $c$. A divider 83 provides the mathematical operation of $k/\Delta t$, where $k$ is a calibration constant to scale the output in terms of liquid water content. A sample-and-hold unit 84 retains the meter display at 88 until updated.

In the embodiment of FIG. 9, clock pulses are again gated by AND-gate 91, and totalled on a decade counter 95. Control unit 96 transfers the total count to an LSI calculator chip 97 which performs the appropriate division and scaling with the resultant liquid water content value being displayed at 98. The control unit 96 then resets the counter 95 is readiness for the next sample.

In the embodiment of FIG. 10, a look-up table technique is used, with values of liquid water content stored in a programmable read-only memory 107. The appropriate address is obtained from gated clock pulses obtained as in the two previous methods. The appropriate value is displayed at digital display unit 108.

Figure 11:
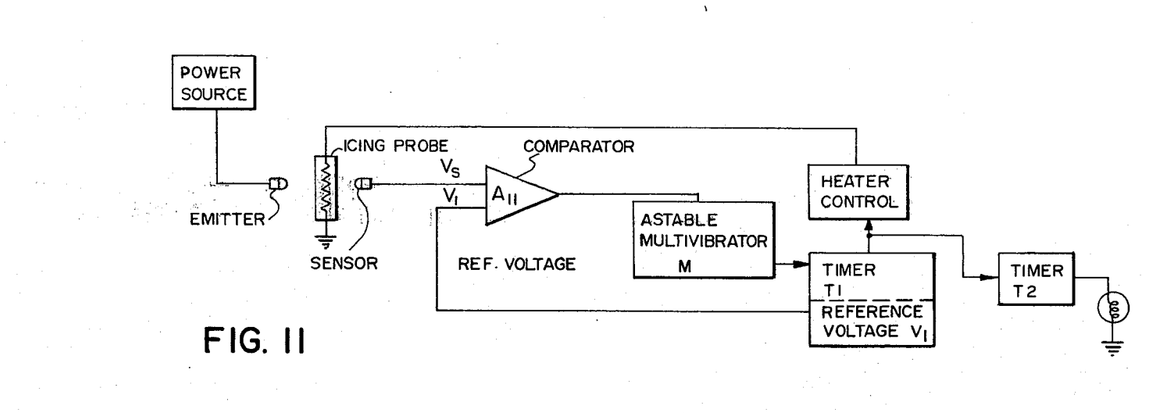
FIG. 11 is a schematic diagram of another embodiment of circuitry for the ice detector.
Figure 12:
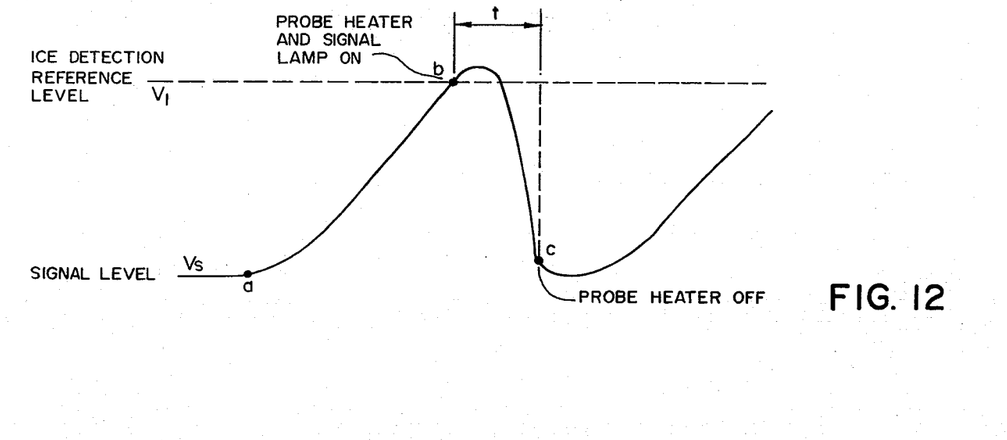
FIG. 12 is a schematic diagram illustrating the icing cycle for the circuit of FIG. 11.

FIG. 11 illustrates another embodiment of a circuit for the ice detector using a single reference level and a fixed heating cycle of the probe. FIG. 12 illustrates the corresponding icing cycle. As the emission of radiation from the emitter to the sensor is progressively occluded by formation of ice on the heater probe, the received signal $V_s$ rises and is compared to a reference voltage $V_1$ by the comparator $A_{11}$. When the signal level $V_s$ exceeds the reference level $V_1$, which corresponds to occlusion of a major portion of the radiation, the comparator $A_{11}$ changes state and turns on the astable multivibrator M. The output pulse train from the astable multivibrator M is applied to the trigger terminal of the timer $T_1$ which on receipt of the first pulse is initiated for a fixed time period $t$. Two features of the timer $T_1$ are that it provides a regulated reference voltage that is used by the comparator $A_{11}$, and that after the first trigger pulse the timer is immune to further trigger pulses until expiration of its fixed time period. The timer $T_1$ output is used to switch the heater control which in turn supplies current to the probe heater with the resulting heat causing the ice to be removed from the prove. Clearance of the ice results in the signal from the sensor being reduced below the reference level, the comparator reverting to its normal state and switching off the astable multivibrator.

Should the fixed heating period be insufficient to allow removal of ice from the probe, the signal remains above reference level $V_1$ and the comparator $A_{11}$ remains in its switched state, keeping the astable multivibrator M operational and its output initiating another fixed time period by timer $T_1$ and therefore further heating of the probe. This cycle will be repeated until the ice is removed from the probe.

As the period set by $T_1$ is short, its output is used to initiate a second timer $T_2$, set for a longer time period, which controls a suitable warning device.

The addition of a second comparator and a lower reference level corresponding to occlusion of a minor portion of radiation, allows rate of icing methods similar to those previously discussed to be used as a measure of the rate of ice formation on the probe.

Referring to FIGS. 7 and 12, it will be noted that the signal level $V_s$ of FIG. 12 varies inversely with occlusion, in contrast to signal level $A_1$ of FIG. 7 which varies directly. The arrangement employed is a matter of choice depending, for example, on the type of sensor used, it being important only that a predetermined signal level be crossed to initiate probe heating.

What is claimed is:

1. An icing detector, for detecting the presence in the atmosphere of supercooled droplets, comprising:
    a. a duct member having an annular plenum formed in one end thereof;
    b. means for supplying pressurized gas to said plenum;
    c. primary jet outlet means communicating with said plenum, said primary jet outlet means being disposed within the duct to induce secondary ambient air flow through the duct;
    d. a probe mounted within said duct member so that supercooled water droplets suspended in the induced secondary ambient air flow impinge on said probe and form ice thereon; and
    e. sensing means for detecting the presence of ice on said probe comprising an emitter for emitting radiation that is attenuated by ice and a radiation sensor, said emitter and sensor being mounted in the duct member so that ice formed on the probe occludes the radiation from the emitter to the sensor.

2. The apparatus of claim 1 wherein the duct member comprises an aerodynamically smooth entry section at said one end of the duct having the plenum formed therein, a short mixing section and a diffuser section, and wherein said primary jet outlet means is disposed substantially at the transition of the entry section and the mixing section.

3. The apparatus of claim 1 wherein the primary jet outlet means is defined by passageways in the duct member communicating with the plenum and opening to the interior of the duct.

4. The apparatus of claim 1 wherein the primary jet outlet means is defined by an annular opening of the plenum to direct primary air along the inner surface of the duct member.

5. The aparatus of claim 1 further comprising insulating means disposed about said probe projecting from the inner surface of the duct a distance substantially equal to the thickness of the primary jet for preventing primary jet flow from contacting said probe.

6. The apparatus of claim 1 comprising heating means for heating the pressurized gas supplied to the plenum, for preventing icing of the duct member.

7. The apparatus of claim 1 having a discontinuity on the outer surface of said duct member in order to reduce the tendency of ice formation at an end of the duct remote from the end having the annular plenum.

8. The apparatus of claim 1 wherein the emitter and sensor are each mounted in a recess within the duct member, each of said recesses communicating with a clean air source so that low air pressure induced by air flow through the duct over the recesses draws clean air over each of the emitter and sensor to prevent deposition of dirt thereon.

9. The apparatus of claim 1 wherein the radiation emitted and sensed is infra-red radiation.

10. An icing detector, for detecting the presence in the atmosphere of supercooled droplets, comprising;
    a. A duct member having a plenum formed in one end thereof;
    b. means for supplying pressurized gas to said plenum;
    c. primary jet outlet means communicating with said plenum, said primary jet outlet means being disposed within the duct member to induce secondary ambient air flow through the duct;
    d. a probe mounted within said duct member so that supercooled water droplets suspended in the induced secondary ambient air flow impinge on said probe and form ice thereon;
    e. probe heating means for periodic melting of ice formed on the probe;
    f. a radiation emitter for emitting radiation that is attenuated by ice and a radiation sensor mounted within said duct member, said emitter and sensor cooperating with the probe to detect ice formation on the probe by the occlusion of radiation from the emitter to the sensor;
    g. means for producing a signal related to the magnitude of radiation received by said sensor;
    h. means responsive to a predetermined lower signal level for initiating probe heating and means responsive to an upper signal level for terminating probe heating;
    i. means for determining the rate of signal change between the upper and lower levels; and
    j. indicator means responsive to the rate of signal change to provide a quantitative indication of the ambient icing condition.

11. The apparatus of claim 10 wherein the probe heating means comprises an electrical resistance element and wherein a portion thereof at which ice is detected has reduced electrical resistance relative to other portions of the probe member.

12. The apparatus of claim 10 wherein the probe has a cylindrical configuration with a flat portion on an upstream side with respect to induced airflow, and wherein said probe is disposed substantially transverse to a central longitudinal axis of the duct member.

13. The apparatus of claim 10 wherein the emitter and sensor are disposed such that a central axis of a beam of radiation from the emitter to the sensor is substantially a half beam width from the probe and substantially at a right angle to a longitudinal axis of the probe.

14. An icing detector, for detecting the presence in the atmosphere of supercooled droplets, comprising:
   a. a duct member having a plenum formed in one end thereof;
   b. means for supplying pressurized gas to said plenum;
   c. primary jet outlet means communicating with said plenum, said primary jet outlet means being disposed within the duct member to induce secondary ambient air flow through the duct;
   d. a probe mounted within said duct member so that supercooled water droplets suspended in the induced secondary ambient air flow impinge on said probe and form ice thereon;
   e. probe heating means for periodic melting of ice formed on the probe;
   f. a radiation emitter for emitting radiation that is attenuated by ice and a radiation sensor mounted within said duct member, said emitter and sensor cooperating with the probe to detect ice formation on the probe by the occlusion of radiation from the emitter to the detector;
   g. means for producing a signal related to the magnitude of radiation received by said sensor;
   h. means responsive to a predetermined lower signal level for initiating probe heating and means responsive to an upper signal level for terminating probe heating;
   i. means for producing a time interval signal related to the time interval in progressing from the upper signal level to the lower signal level; and
   j. means responsive to the magnitude of said time interval signal to provide a quantitative indication of the ambient icing condition.

15. The apparatus of claim 14 wherein the means for measuring the time interval in progressing from the upper signal level to the lower signal level comprises a pulse generator, means for gating the pulses in the interval between the upper and lower signal levels, and integrating means for providing an output proportional to the time interval.

16. The apparatus of claim 15 wherein the output of the integrating means in inverted by analog means to provide a measure of ambient liquid water content.

17. The apparatus of claim 15 wherein the integrating means comprises digital means for counting the gated pulses, and digital calculator means for transforming the count to provide an output in terms of ambient liquid water content.

18. The apparatus of claim 15 wherein the integrating means comprises digital means for counting the gated pulses to provide an address to means for storing a look-up table of liquid water content values.

19. An icing detector, for detecting the presence in the atmosphere of supercooled droplets, comprising:
   a. a duct member having a plenum formed in one end thereof;
   b. means for supplying pressurized gas to said plenum;
   c. primary jet outlet means communicating with said plenum, said primary jet outlet means being disposed within the duct member to induce secondary ambient air flow through the duct;
   d. a probe mounted within said duct member so that supercooled water droplets suspended in the induced secondary ambient air flow impinge on said probe and form ice thereon;
   e. probe heating means for periodic melting of ice formed on the probe;
   f. a radiation emitter for emitting radiation that is attenuated by ice and a radiation sensor cooperating with the probe to detect ice formation on the probe by the occlusion of radiation from the emitter to the sensor;
   g. means for producing a signal related to the magnitude of radiation received by said sensor;
   h. means responsive to said signal crossing a predetermined signal level corresponding to occlusion of a major portion of the radiation for initiating probe heating;
   i. timing means for terminating probe heating after a predetermined time interval provided that the signal has recrossed said predetermined signal level, but allowing repetition of probe heating for another of said time intervals if the signal has not recrossed said predetermined signal level; and
   j. indicator means for indicating activation of the probe heating means.

20. The apparatus of claim 19 including means for determining the rate of signal change between a predetermined signal level corresponding to occlusion of a minor portion of the radiation and said signal level corresponding to the occlusion of the major portion of the radiation and indicator means responsive to the rate of signal change to provide a quantitative indication of the ambient icing condition.

* * * * *